United States Patent [19]
Williams, deceased et al.

[11] Patent Number: 4,978,961
[45] Date of Patent: Dec. 18, 1990

[54] SYNTHETIC APERTURE RADAR WITH DEAD-AHEAD BEAM SHARPENING CAPABILITY

[75] Inventors: Fred C. Williams, deceased, late of Vancouver; by Dorothy Williams, executor, Vancouver, Wash.

[73] Assignee: Hughes Aircraft Company, Los Angeles, Calif.

[21] Appl. No.: 454,793

[22] Filed: Dec. 21, 1989

[51] Int. Cl.⁵ ............................................. G01S 13/90
[52] U.S. Cl. ....................................................... 342/25
[58] Field of Search .......................................... 342/25

[56] References Cited

U.S. PATENT DOCUMENTS

| | | | |
|---|---|---|---|
| 4,064,510 | 12/1977 | Chabah | 342/25 X |
| 4,134,113 | 1/1979 | Powell | 342/25 |
| 4,387,373 | 6/1983 | Longuemare | 342/25 |
| 4,853,699 | 8/1989 | Easton | 342/25 |

Primary Examiner—Gilberto Barron, Jr.
Attorney, Agent, or Firm—Leonard A. Alkov; Wanda K. Densson-Low

[57] ABSTRACT

A synthetic aperture radar is disclosed, having the capability of dead-ahead beam sharpening. A monopulse antenna having sum and difference ports is employed, generating from the radar returns sum port signals and difference port signals. The respective sum and difference port signals are provided to respective first and second SAR processors. The processor output data is processed to separate the returns from each side of the SAR velocity vector and yield an unambiguous, doppler beam sharpened ground map about the velocity vector.

9 Claims, 4 Drawing Sheets

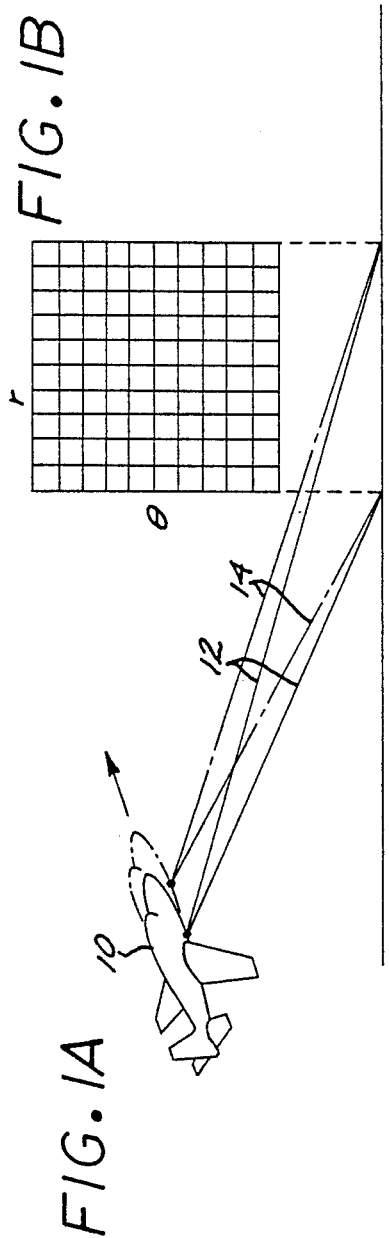
FIG. 1A
FIG. 1B
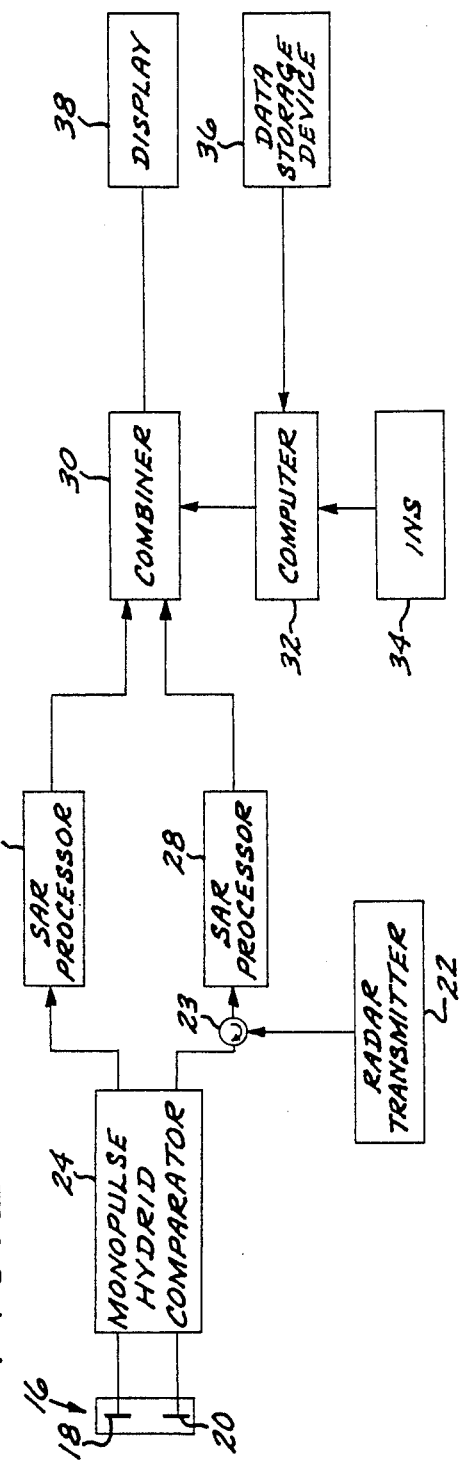
FIG. 2

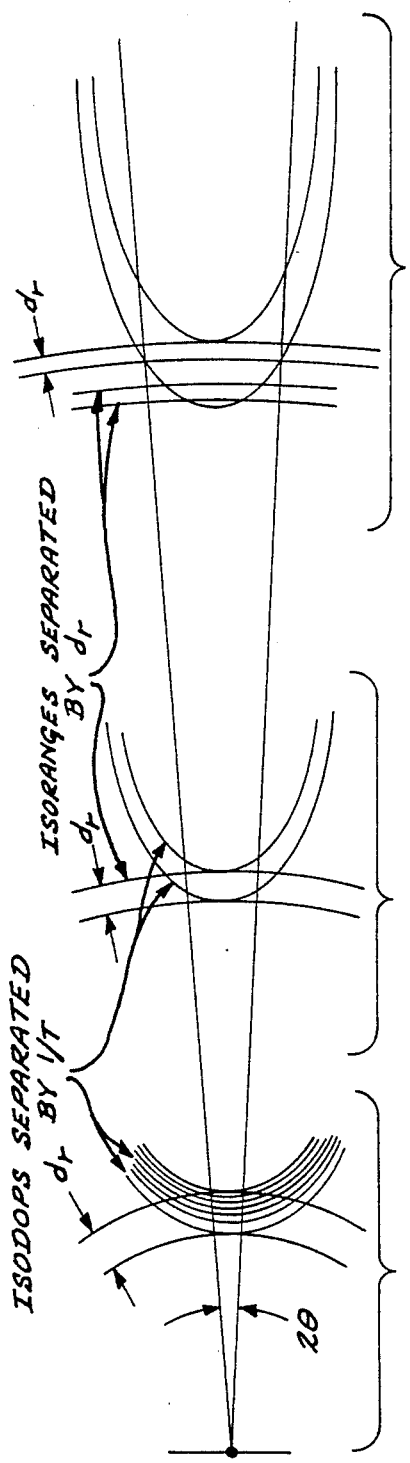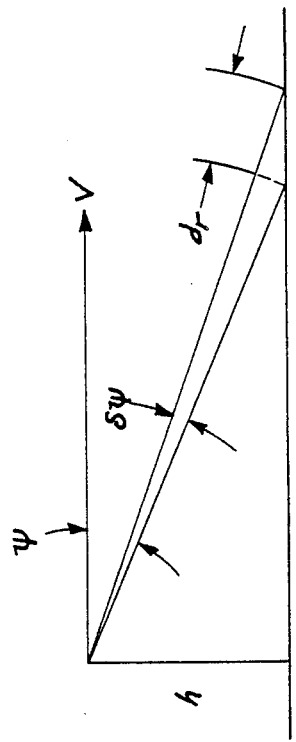

SYNTHETIC APERTURE RADAR WITH DEAD-AHEAD BEAM SHARPENING CAPABILITY

BACKGROUND OF THE INVENTION

The present invention relates to synthetic aperture radar (SAR) systems, and more particularly to an SAR system having dead-ahead beam sharpening capability.

Synthetic aperture radar is well known for such applications as high resolution ground mapping. In this technique, the effective antenna aperture length is increased by utilizing the motion of the moving vehicle, such as an aircraft, in which the radar equipment is located. The effective antenna aperture length is increased by combining the return signals from a number of pulses transmitted by the radar equipment while the aircraft is moving relative to the ground area under scrutiny to form each azimuth line of the azimuth-range grid being processed. This technique permits very high azimuth resolution to be achieved.

A point in the radar map image can be located by two coordinates, the distance from the radar to the point and the amount of Doppler shift due to the platform motion of the radar signal for that point. The range can be measured by the time it takes for the radar signal to return to the SAR receiver. The measurement of the Doppler shift of the returned signals gives the azimuth location of the point with reference to the SAR's line of flight, since the moving vehicle carrying the SAR equipment will have a velocity component either approaching or receding from the point at any given time. If the antenna is not pointed in the direction of the velocity vector, each point in the radar beam will have a unique Doppler shift and range; these two coordinates and a knowledge of the angle of the antenna's line of sight with respect to the surface are all that are needed to get a fix on the location of any returned signal. Knowledge of the antenna pointing is required to resolve the ambiguity arising from points on the opposite side of the velocity vector which have the same range and doppler coordinate. The brightness of the image at that point becomes an element of the map image.

The conventional wisdom in the SAR art that it is impossible to provide beam sharpening in the direction of the velocity vector of the moving vehicle. This occurs because the antenna when pointed in that direction cannot isolate the points, i.e., resolve the ambiguities, on opposite sides of the velocity vector with the same range and doppler. As a result, SAR systems have not been used for many applications, such as aircraft landing systems, gunfire control radars and bombing radars, because the conventional synthetic array cannot look dead-ahead.

SUMMARY OF THE INVENTION

It would therefore represent an advance in the art to provide a SAR system having beam sharpening capabilities in the direction of the velocity vector of the SAR.

In accordance with the invention, a SAR radar is mounted on a moving craft, and comprises means for receiving on board the moving craft radar returns with a monopulse antenna having a sum port and a difference port to provide a sum port signal from the sum port and a difference port signal from the difference port.

A first SAR receiver processes the sum port signals over a given time period to generate a first set of SAR signals representing the radar returns from the respective cells of a doppler frequency, range grid. For a given doppler frequency f, the first set of SAR signals are characterized by velocity ambiguities at azimuth angles $a_f$ and $-a_f$ with respect to the velocity vector of the moving craft. A second SAR receiver processes the difference port signals over a given time period to generate a second set of SAR signals representing the radar returns from the respective cells of the grid.

The apparatus further comprises means for performing a weighted linear combination of the first and second sets of SAR signals to form first output signals representing a left looking antenna where the ambiguous returns to the right of the velocity vector are cancelled, and second output signals representing a right looking antenna, wherein the ambiguous return to the left of the velocity vector are cancelled.

BRIEF DESCRIPTION OF THE DRAWINGS

These and other features and advantages of the present invention will become more apparent from the following detailed description of an exemplary embodiment thereof, as illustrated in the accompanying drawings, in which:

FIG. 1A is a diagram of an aircraft and the beam generated by the SAR radar equipment carried by the aircraft.

FIG. 1B is a diagram of an azimuth-range grid mapping the ground area under surveillance by the aircraft of FIG. 1A.

FIG. 2 is a schematic block diagram of an apparatus for practicing the invention.

FIGS. 7A–7C are illustrations of the antenna beam and exemplary isodoppler lines for three considered ranges illustrating minimum range considerations for apparatus embodying the invention.

FIG. 8 is a graphical illustration of a limiting case showing the minimum range at which nonambiguous azimuth resolution is provided.

DETAILED DESCRIPTION OF THE PREFERRED EMBODIMENT

Figure 3A:
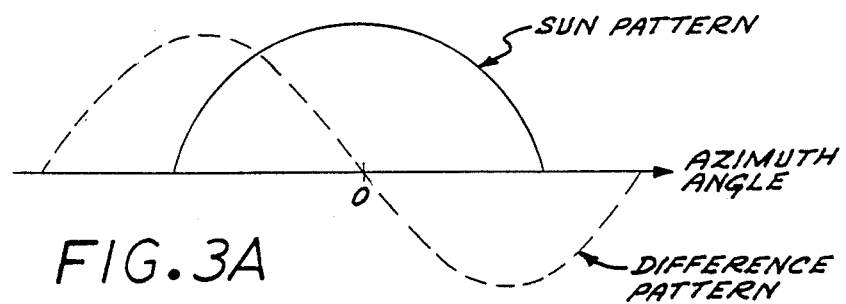
FIGS. 3A and 3B are graphical representations of array sum and difference patterns, and of processed array patterns tuned to isolate the left azimuth ambiguity and the right azimuth ambiguity.

In FIG. 1A, radar equipment on board a moving aircraft 10 transmits radar pulses through an antenna whose beam 12 illuminates the area of ground terrain 14. As described below, the radar equipment on board aircraft 10 generates SAR signals representing radar returns from respective cells of an azimuth-range grid represented in FIG. 1B. The grid comprises crossed lines of azimuth 8 and increments of range r that form the individual cells mapped by the radar equipment. Antenna beam 12 illuminates only part of the area 14 at a given time. It will be understood therefore that as represented by the dashed outline, each azimuth cell is generated during a time period in which the aircraft 10 travels some distance relative to the area 14.

FIG. 2 depicts the radar equipment on board the moving aircraft. The antenna 16 has two apertures 18 and 20. The antenna 16 is a two-dimensional array having slotted elements and a tapered radiation pattern segmented for reception purposes into two halves which comprise aperture 18 and 20, i.e., a two-dimensional planar array. Reference is made to pages 141-146 of the treatise "Introduction to Airborne Radar," by G. W. Stimson, Hughes Aircraft Company 1983, the disclosure of which is incorporated herein by reference for further description of such an antenna. A conventional radar transmitter 22 is connected to apertures 18 and 20 via circulator device 23 and hybrid 24. Transmitter 22 feeds radio frequency pulses to antenna 16 at a pulse repetition frequency (PRF). Antenna 16 receives the returns of the pulses from the ground area 14. Apertures 18 and 20 are connected to a conventional hybrid device 24 which produces two output signals, one signal the sum ($\Sigma$) of the signals received at the two apertures 18 and 20, the other signal the difference ($\Delta$) of the signals received at the two apertures. In a general sense, any monopulse antenna could be used to provide a receive antenna sums and difference signals, including an amplitude monopulse antenna. Thus, the monopulse antenna in general may be characterized as having sum and difference ports, and wherein antenna sum signals are provided at the sum port, and antenna difference signals are provided at the difference port.

The sum signal from the hybrid 24 is applied to a first conventional SAR receiver 26. The difference signal from the hybrid 24 is applied to a second conventional SAR receiver 28. SAR processors 26 and 28 comprise conventional apparatus that process the respective sum and difference signals in the manner described on pages 515-562 of the referenced treatise, "Introduction to Airborne Radar."

SAR processor 26 generates a set of first SAR signals X(r,f), where r denotes range and f denotes doppler frequency. The signals X(r,f) represent SAR processed signals through the sum channel and are typically in digital form, representing radar returns from the respective cells of the doppler frequency, range grid prior to transformation to an azimuth-range grid. In the frequency-range grid, azimuth ambiguities exist which preclude a unique mapping of doppler frequency to azimuth. Similarly, SAR processor 28 generates a series of second SAR signals Y(r,f) (SAR processed signals through the difference channel), typically in digital form, representing the radar returns from the respective cells of the frequency-range grid for the difference channel.

In accordance with the invention, the first and second SAR processor signals are fed to combiner 30. The function of device 30 is to form signals representing antennas looking to the left and to the right of the velocity vector. This is accomplished by taking the sum map X(r,f) which for each frequency f has velocity ambiguities at azimuth angles of $a_f$ and $-a_f$, and combining the signal two different ways with the difference map Y(r,f). This forms two new signals, $Z_L(r,f)$, which represents a left looking antenna where the ambiguous return to the right of the velocity vector cancelled, and $Z_R(r,f)$, which represents a right looking antenna where the ambiguous returns to the left of the velocity vector are cancelled. This combining is given by $$Z_L(r,f) = M_L(r,f)X(r,f) + N_L(r,f)Y(r,f)$$

$$Z_R(r,f) = M_R(r,f)X(r,f) + N_R(r,f)Y(r,f)$$

where $M_L$, $M_R$, $N_L$, and $N_R$ are complex weighting coefficients.

The complex weighting coefficients are derived by a computer 32 on the basis of input data supplied by an inertial navigation system (INS) 34 and a data storage device 36 such as a read only memory as described below. INS 34 produces time varying signals representative of the position and velocity of aircraft 10 relative to ground area 14, which enables the functional dependence of the doppler frequency f and the azimuth angle $a_f$ to be computed. The data storage device 36 contains the antenna patterns for the sum and difference patterns for antenna 16. This data is used by computer 32 to form antenna gains $G_\Sigma(r,a_f)$, $G_\Sigma(r,-a_f)$, $G_\Delta(r,a_f)$ and $G_\Delta(r,-a_f)$ which are the sum and difference antenna two way gains in the direction corresponding to range of r and in both $a_f$ and $-a_f$ directions. Then, the complex weights are given by $$M_L(r,f) = \frac{G_\Delta^*(r,a_f)}{|G_\Delta^*(r,a_f)G_\Sigma(r,-a_f) - G_\Sigma^*(r,a_f)G_\Delta(r,-a_f)|}$$

$$N_L(r,f) = \frac{-G_\Sigma^*(r,a_f)}{|G_\Delta^*(r,a_f)G_\Sigma(r,-a_f) - G_\Sigma^*(r,a_f)G_\Delta(r,-a_f)|}$$

$$M_R(r,f) = \frac{G_\Delta^*(r,-a_f)}{|G_\Delta^*(r,-a_f)G_\Sigma(r,a_f) - G_\Sigma^*(r,-a_f)G_\Delta(r,a_f)|}$$

$$N_R(r,f) = \frac{-G_\Sigma^*(r,-a_f)}{|G_\Delta^*(r,-a_f)G_\Sigma(r,a_f) - G_\Sigma^*(r,-a_f)G_\Delta(r,a_f)|}$$

The output of combiner 30 can be fed to a display device 38 or other recording device. The pixel intensity for a given range, azimuth cell is given by $$P(r,-a_f) = |Z_L(r,f)|^2$$

$$P(r,a_f) = |Z_R(r,f)|^2$$

where $a_f$ is the azimuth coordinate corresponding to the point on the ground to the right of the velocity vector with doppler frequency f.

FIG. 3A illustrates in a simplified graphical form typical sum and difference patterns as a function of the angular position ($\theta$) in relation to the antenna array boresight. These patterns are well known in the monopulse radar field. Thus, when the target is located directly on the boresight, the signals from the respective two apertures are equal and in phase, and cancel each other when differenced as shown by the null in the difference pattern. Conversely, the sum signal peaks in this case. As the angular position deviates from the boresight, the sum signal decreases in magnitude, while the difference signal increases to relative amplitude maxima before decreasing in amplitude. An exemplary antenna useful in the present invention may have an effective beam width (null to null) of about six degrees oriented in the direction of the aircraft velocity vector.

Figure 3B:
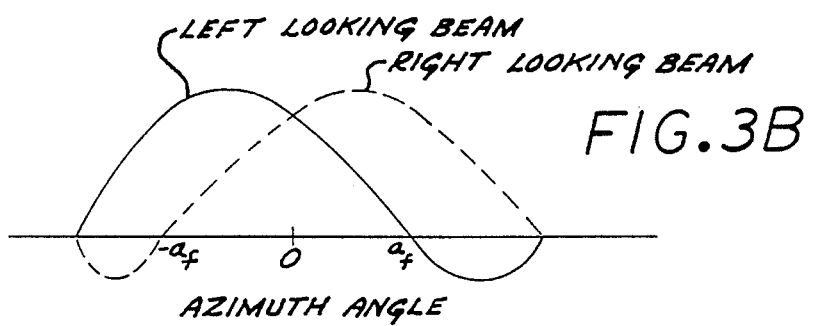

FIG. 3B illustrates the two patterns resulting from forming the weighted linear combination of the sum signal with the difference signal, as prescribed in forming $Z_L(r,f)$ and $Z_R(r,f)$. These patterns are for fixed values of $M_L$, $N_L$, $M_R$ and $N_R$ It is apparent that the combination forming $Z_L(r,f)$ results in a shifting of an effective pattern to the left of the sum pattern (FIG. 3A) while the latter combination results in shifting of the waveform to the right. This property is exploited by the invention to recover the signal vectors from the left and right array apertures.

The dead-ahead beam sharpening performance of the system shown in FIG. 2 will be described hereinbelow by relating the system to an endfire array. Endfire arrays are well known in the antenna art. They grow very long for narrow beams and are difficult to construct due to mutual coupling between the elements. Both of these difficulties are overcome with a synthetic endfire antenna, which is the appropriate model for dead-ahead beam sharpening performance evaluation. Synthetic antennas are presently operating at effective lengths of several thousand feet and mutual coupling cannot exist between time sequential elements.

Figure 4:
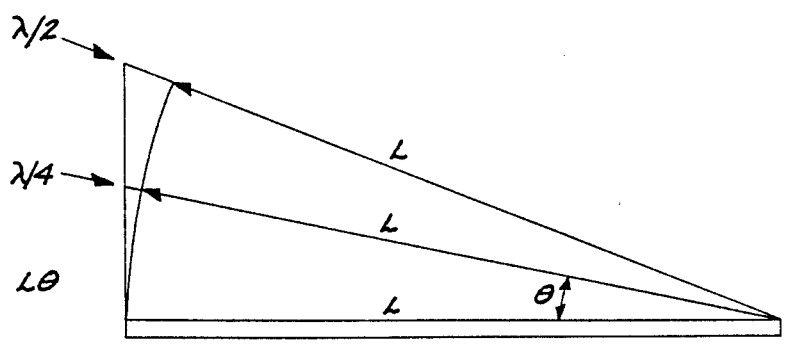
FIG. 4 is a diagram illustrating the resolution of an endfire array.
Figure 5:
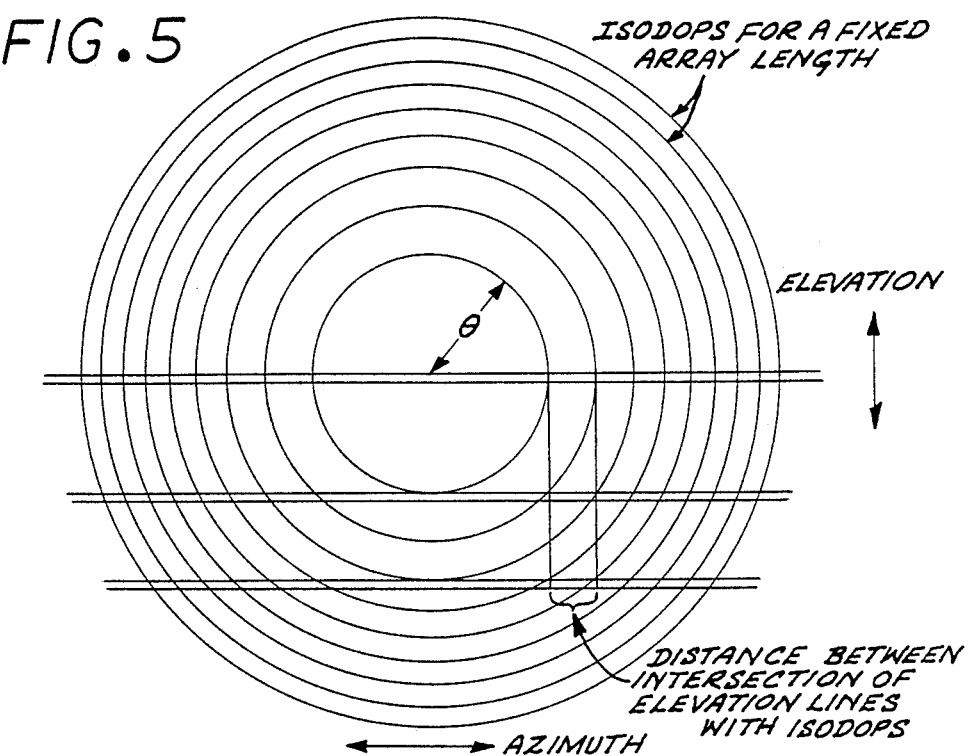
FIG. 5 illustrates a Fresnel Zone Plate formed by the isodoppler lines of an endfire array.

The resolution of an endfire array of an antenna of length L can be derived from FIG. 4. Expanding sides of the triangle by the Pythagorean Theorem and dropping small terms yields $\theta^2 = \lambda/2L$. The value of $\lambda/4$ yields the $-3$ dB points of a synthetic array. The value of $\lambda/2$ yields the first null of the dead-ahead synthetic beam or the peak of the next beam generated by an array of length L. The Nth beamwidth decreases like $(\lambda/2L)^{\frac{1}{2}}((N+1)^{\frac{1}{2}} - (N)^{\frac{1}{2}}) \approx (\lambda/8LN)^{\frac{1}{2}}$. How this beamwidth relates to ground resolution can be seen by examining the isodoppler lines whose separation for constant change in doppler is proportional to the endfire resolution. The isodoppler lines form a Fresnel Zone Plate as shown in FIG. 5. Since any elevation cut across a Fresnel Zone Plate shows the same element spacing (i.e., the distance between the intersections of elevation lines with the isodoppler lines is independent of elevation), the azimuth resolution is independent of the elevation angle and depends only on azimuth angle and not on cone angle as commonly supposed. This effect is illustrated by the various ground plane cuts in FIG. 5. This provides easily predictable performance for the system, since resolution is not a function of elevation.

Figure 6:
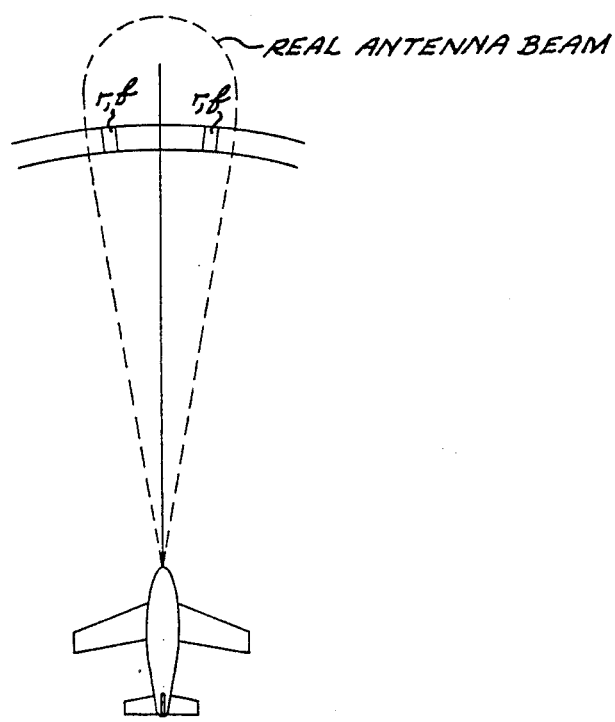
FIG. 6 is a view illustrating the beam of an aircraft carrying the apparatus of FIG. 2.

At small squint angles of an end-fire array, the real beam illuminates two simultaneous directions on each side of the velocity vector that return ground data at the same range and doppler frequency. This is shown in the top view of FIG. 6 looking down on the moving aircraft. In accordance with the invention, this pair of returns can be separated to yield a 10:1 or better, unambiguous doppler beam sharpened ground map straight ahead. Hence, the map produced by the invention will have angular resolution 10 times finer than the sum antenna beam.

Multiple targets at the same range and doppler frequency but in different directions away from the moving craft velocity vector are separated using a multiple aperture or monopulse antenna such as antenna 16 (FIG. 2). In particular, since the direction to each of the ambiguous returns at a given doppler frequency is known, a simple azimuth monopulse antenna is all that is required.

As described above with respect to the preferred embodiment, the doppler filtered sum and difference signals from the monopulse hybrid device are combined to cancel the ambiguous returns. To exhibit that the weighted linear combination of SAR signals in the preferred embodiment provides the ambiguity cancellation, consider the SAR signals at range r and doppler frequency f. As before, let X(r,f) be the SAR signal for the sum channel and Y(r,f) be the SAR signal for the difference channel. Since the directions ($\pm a_f$) to the ambiguous doppler frequencies relative to the velocity vector can be computed by $$a_f = \cos^{-1}(Vf/2\lambda)$$

where V is the aircraft speed, the antenna gains in these directions can be computed given the antenna pointing angle relative to the velocity vector. Then, from knowledge of the antenna gain and the antenna pointing direction, the antenna gains $G_\Sigma(r, a_f)$, $G_\Delta(r, -a_f)$, $G_\Sigma(r, a_f)$, and $G_\Delta(r, -a_f)$ for the sum and difference antenna in the directions corresponding to azimuth angle $\pm a_f$ at range r can be determined. Typically these gains are determined for each doppler filter.

Consider a scatterer at $(r, a_z)$. Then through substitution of the antenna gains in the expressions for the preferred embodiment, the response of the scatter for $Z_L(r,f)$ and $Z_R(r,f)$ is as follows:

$$Z_L(r,f) = M_L(r,f) G_\Sigma(r, a_z) + N_L(r,f) G_\Delta(r, a_z)$$

$$Z_R(r,f) = M_R(r,f) G_\Sigma(r, a_z) + N_R(r,f) G_\Delta(r, a_z).$$

This response is shown in FIG. 3B, where the doppler response is not included. Finally, substituting the gains $M_L(r,f)$, $M_R(r,f)$, $N_L(r,f)$ and $N_R(r,f)$, the processed gain of a scatterer at $(r, a_z = -a_f)$ is given by $$Z_L(r,f) = 0$$

$$Z_R(r,f) = 1$$

which shows that the scatterer at $a_f$ is cancelled from the left signal $Z_L(r,f)$ and has unity gain in the right signal $Z_R(r,f)$. Similarly, a scatterer at $(r, -a_f)$ will be cancelled in the $Z_R(r,f)$ signal, which establishes the desired properties.

It will be appreciated that typically the system will process the sum and difference signals to provide left and right looking beams for each doppler filter.

The dead-ahead $-3$ dB azimuth resolution for an array length of L is $\theta = (\lambda/2L)^{\frac{1}{2}}$. For $\lambda = 3$ cm and L of 50 to 500 meters, $\theta$ is about 5 to 15 mrad. Such an array length will yield manageable motion compensation requirements and coherent array times (the time required to traverse the array length L) of 0.3 to 3 seconds at aircraft speeds on the order of Mach 0.5. Operationally, the real antenna beamwidth is about 50 mrad, which will yield azimuth resolution improvements of 3 to 10 at dead-ahead, improving rapidly as one moves away from that direction. This corresponds to the resolution computed above of 5 to 15 mrad.

By flying a synthetic array of length L, separable isodoppler lines are generated, separated by $f_d = V/L = 1/T$, where T is the array time and V is the velocity. At short range several of these isodopplers lie inside one range resolution cell on the ground, and at certain ranges the azimuth resolution is worse than $R\theta$ as shown in FIG. 7A. At long range, the several range resolution cells lie between a pair of separable isodoppler lines and the azimuth resolution is $R\theta$ or better at all ranges as shown in FIG. 7C. The limiting case, shown in FIG. 7B, is where the elevation angle change $\delta\omega$ for a pair of separable isodoppler just equals the elevation angle change for one range resolution cell, as shown in FIG. 8. The range corresponding to the case of FIG. 7B may be found as follows.

The elevation angle change, ($\delta\omega_1$), for one range resolution cell ($d_r$) is $\delta\omega_1 = h \, d_r/R^2$. The angle ($\delta\omega_2$) between isodoppler lines at angle $\omega$ is found from:

$$1/T = v/L = f_d = (2v/\lambda)(\cos\omega - \cos(\omega + \delta\omega_2))$$

$$L = \lambda/2\theta^2$$

$$\omega = L/R$$

$$\cos\omega \approx 1 - \omega^2/2$$

$$(2v\theta^2)/\lambda \approx (2v/\lambda)(h/r)(\delta\omega_2)$$

$$\delta\psi_2 \approx R\theta^2/L$$

$$= \delta\psi_1 = hd_r/R^2$$

Therefore, $R^3 = h^2 d_r/\theta^2$ provides a minimum range for a worst case azimuth resolution of $\theta$, where h is altitude, $d_r$ is range resolution and $\theta$ is the beamwidth at dead ahead.

It is understood that the above-described embodiment is merely illustrative of the possible specific embodiments which may represent principles of the present invention. Other arrangements may readily be devised in accordance with these principles by those skilled in the art without departing from the scope of the invention.

What is claimed is:

1. A synthetic aperture radar (SAR) apparatus having dead-ahead beam sharpening capability in a moving craft, comprising:
    means for receiving on board the moving craft radar returns with a monopulse antenna having a sum port and a difference port to provide a sum port signal from the sum port and a difference port signal from the difference port;
    first SAR processing means for processing the sum port signals over a given time period to generate a first set of SAR signals representing the radar returns from the respective cells of a doppler frequency, range grid, said first set of SAR signals characterized by doppler ambiguities from azimuth angles on opposite sides of the velocity vector of the moving craft;
    second SAR processing means for processing the difference port signals over a given time period to generate a second set of SAR signals representing the radar returns from the respective cells of the grid; and
    means for performing a weighted linear combination of said first and second sets of SAR signals to form first output signals representing a left looking antenna where the ambiguous returns to the right of the velocity vector are cancelled, and second output signals representing a right looking antenna, wherein the ambiguous returns to the left of the velocity vector are cancelled.

2. The SAR apparatus of claim 1 wherein said monopulse antenna has an effective main beamwidth from null to null of about six degrees and is substantially oriented in the direction of the velocity vector of the moving craft.

3. The SAR apparatus of claim 1 wherein said first set of SAR signals is represented by the sum map $X(r,f)$, where r is the range and f is the doppler frequency, said second set of SAR signals is represented by the difference map $Y(r,f)$, and wherein said means for performing a weighted linear combination provides first output signals $Z_L(r,f)$ which represents said left looking antenna and second output signals $Z_R(r,f)$ which represents said right looking antenna, and which signals are characterized by the relationships $$Z_L(r,f) = M_L(r,f) X(r,f) + N_L(r,f) Y(r,f)$$

$$Z_R(r,f) = M_R(r,f) X(r,f) + N_R(r,f) Y(r,f)$$

where $M_L$, $M_R$, $N_L$ and $N_R$ are complex weight coefficients which are dependent on the position and velocity of the moving craft.

4. The SAR apparatus of claim 3 further comprising a display device for displaying said first and second output signals, wherein the pixel intensity P for a given range, azimuth cell is given by $$P(r, -a_f) = |Z_L(r,f)|^2$$

$$P(r, a_f) = |Z_R(r,f)|^2,$$

where $a_f$ is the azimuth angle to the right of the velocity vector corresponding to doppler frequency f, and $-a_f$ is the azimuth angle to the left of the velocity vector corresponding to doppler frequency f.

5. A synthetic aperture radar (SAR) apparatus having dead-ahead beam sharpening capability in a moving craft, comprising:
    means for receiving on board the moving craft radar returns with an antenna having left and right apertures to produce corresponding left and right return signals;
    means for providing a sum signal representing the sum of said left and right return signals and for providing a difference signal representing the difference between said left and right return signals;
    first SAR processing means for processing the sum signal over a given time period to generate a first set of component SAR signals representing the radar returns from the respective cells of an doppler frequency range grid, said first set of SAR signals characterized by doppler ambiguities from azimuth angles on opposite sides of the velocity vector of the moving craft;
    second SAR processing means for processing the difference signal over a given time period to generate a second set of component SAR signals representing the radar returns from the respective cells of the grid; and
    means for performing a weighted linear combination of said first and second sets of SAR signals to form first output signals representing a left looking antenna where the ambiguous returns to the right of the velocity vector are cancelled, and second output signals representing a right looking antenna, wherein the ambiguous returns to the left of the velocity vector are cancelled.

6. The SAR apparatus of claim 5 wherein said monopulse antenna has an effective main beamwidth from null to null of about six degrees and is substantially oriented in the direction of the velocity vector of the moving craft.

7. The SAR apparatus of claim 5 wherein said first set of SAR signals is represented by the sum map $X(r,f)$, where r is the range and f is the doppler frequency, said second set of SAR signals is represented by the difference map $Y(r,f)$, and wherein said means for performing a weighted linear combination provides first output signals $Z_L(r,f)$ which represents said left looking antenna and second output signals $Z_R(r,f)$ which represents said right looking antenna, and which signals are characterized by the relationships $$Z_L(r,f) = M_L(r,f) X(r,f) + N_L(r,f) Y(r,f)$$

$$Z_R(r,f) = M_R(r,f) X(r,f) + N_R(r,f) Y(r,f)$$

where $M_L$, $M_R$, $N_L$ and $N_R$ are complex weight coefficients which are dependent on the position and velocity of the moving craft.

8. The SAR apparatus of claim 7 further comprising a display device for displaying said first and second output signals, wherein the pixel intensity P for a given range, azimuth cell is given by $$P(r, -a_f) = |Z_L(r,f)|^2$$

$$P(r, a_f) = |Z_R(r,f)|^2,$$

where $a_f$ is the azimuth angle to the right of the velocity vector corresponding to doppler frequency f, and $-a_f$ is the azimuth angle to the left of the velocity vector corresponding to doppler frequency f.

9. A method for providing dead-ahead beam sharpening capability in a synthetic aperture radar (SAR), comprising the following steps:

receiving on board the moving craft radar returns with a monopulse antenna having a sum port and a difference port to provide a sum port signal from the sum port and a difference port signal from the difference port;

processing the sum port signals over a given time period to generate a first set of SAR signals representing the radar returns from the respective cells of a doppler frequency, range grid, said first set of SAR signals characterized by doppler ambiguities from azimuth angles on opposite sides of the velocity vector of the moving craft;

processing the difference port signals over a given time period to generate a second set of SAR signals representing the radar returns from the respective cells of the grid; and performing a weighted linear combination of said first and second sets of SAR signals to form first output signals representing a left looking antenna where the ambiguous returns to the right of the velocity vector are cancelled, and second output signals representing a right looking antenna, wherein the ambiguous returns to the left of the velocity vector are cancelled.

* * * * *